(No Model.)

D. B. CORLEY.
ROOF SCREW.

No. 436,775. Patented Sept. 23, 1890.

Witnesses
W. S. Clarke
J. E. Lawrence

Inventor
Daniel B. Corley.
By his Attorneys
Harvey Spalding & Sons

UNITED STATES PATENT OFFICE.

DANIEL B. CORLEY, OF ABILENE, TEXAS.

ROOF-SCREW.

SPECIFICATION forming part of Letters Patent No. 436,775, dated September 23, 1890.

Application filed May 2, 1890. Serial No. 350,730. (No model.)

*To all whom it may concern:*

Be it known that I, DANIEL B. CORLEY, a citizen of the United States, residing at Abilene, in the county of Taylor and State of Texas, have invented a new and original Screw for Holding Tin and Iron Roofs and Sidings upon Houses, of which the following is a specification, reference being had to the accompanying drawings, forming a part thereof.

Figure 1:
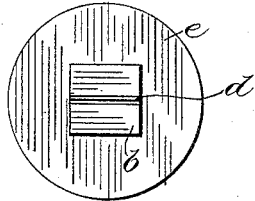
Figure 2:
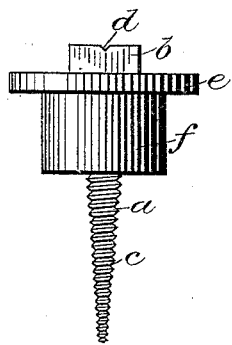
Figure 3:
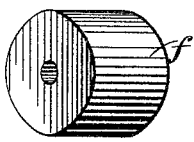

Figure 1 is a plan view looking at the head of the screw. Fig. 2 is an elevation thereof. Fig. 3 is a detail view of the elastic cushion.

Like letters of reference denote corresponding parts in all the figures of the drawings, in which—

$a$ designates the shank of a roof-screw embodying my invention. The shank is pointed at one end, headed at the other end, as at $b$, and threaded for a suitable distance from the pointed end toward the head thereon, as at $c$. This head $b$ is enlarged and made integral with the shank, and it has a transverse notch or recess $d$ made therein to receive a screwdriver or similar tool for forcing the screw into the wood, &c. Below the integral head $b$ of the screw is an enlarged collar or flange $e$, which may be integral with the shank or rigid with the same, or be made separate from the shank and fitted thereon, and an elastic cushion $f$ is fitted on the shank below the integral head $b$ and the enlarged collar or flange $e$, the diameter of said collar or flange being preferably greater than the diameter of the head $b$ and the cushion $f$; but this is optional.

The screw-threaded shank may be similar to the shanks of a wood or metal screw, and the head $b$ can be adapted to receive a wrench or screw-driver.

The leading features of this invention are, first, the screws, being placed, will hold a roof down in time of a wind or storm and keep it from making a noise, and they will also hold the roof so closely down upon whatever it may rest on that no wind can lift it off or lift one side or place more than another and thereby strain and pull the joints of the roof apart so as to make the roof leak; secondly, it is to keep houses from being unroofed in times of storms and tornadoes, the rubber cushion being so tightly pressed down upon the roof by the head of the screw that no water can ever pass down through the hole made in the roof by the screw passing through it. This rubber cushion presses both ways and keeps the water from the screw both above and below. These rubber washers may be replaced by new washers as time may demand.

What I claim as new is—

As a new article of manufacture, a screw consisting of a threaded shank having an integral head, an enlarged collar or flange on said shank below the head thereon, and an elastic cushion on the shank immediately below the enlarged collar or flange, for the purpose described, substantially as set forth.

DANIEL B. CORLEY.

Witnesses:
K. K. LEGETT,
THOMAS BUCK.